Aug. 26, 1969 E. AHRENS 3,463,889

MOVING MAGNET STEREOPHONIC PICKUP

Filed Oct. 21, 1958 2 Sheets-Sheet 1

Aug. 26, 1969 E. AHRENS 3,463,889

MOVING MAGNET STEREOPHONIC PICKUP

Filed Oct. 21, 1958 2 Sheets-Sheet 2

United States Patent Office 3,463,889

Patented Aug. 26, 1969

3,463,889

MOVING MAGNET STEREOPHONIC PICKUP

Erhard Ahrens, Kiel, Schleswig-Holstein, Germany, assignor, by mesne assignments, to Shure Brothers, Incorporated, a corporation of Illinois Filed Oct 21, 1958, Ser. No. 768,785
Claims priority, application Germany, Oct. 30, 1957, E 14,862; Feb. 15, 1958, E 15,377
Int. Cl. H04r *1/16, 9/14*
U.S. Cl. 179—100.41 30 Claims My invention relates to electric transducers for producing or reproducing grooved sound records of the stereophonic type and will be described hereinafter with reference to phonograph pickups for use with record discs although the invention is also applicable to transducers for cutting such records.

Stereophonic records on grooved discs have two undulating sound tracks in a single groove to be simultaneously engaged by a single stylus acting upon two voltage generating transducers respectively. According to one type of such records, one sound track has sidewise undulations like in conventional monaural record discs, and the other track has up-and-down undulations on the groove bottom. Hence the voltage-producing oscillations of the pickup stylus caused by its simultaneous travel along the two sound tracks are vertical and horizontal respectively. In another type of stereo records, now being preferred, the two sound tracks are located on the two opposite, inclined sidewalls of the groove respectively so that the voltage producing stylus oscillations are in two planes inclined 45° to the horizontal record surface. With both types of stereo records, however, the two planes of active pickup oscillations extend at an angle of 90° to each other, and it should be understood that my invention is equally well applicable to both types.

It is an object of my invention to provide a pickup for stereophonic grooved records that not only affords a high degree of separation between the reproduction of the two sound recordings of the groove but also minimizes any detrimental mass effects which the oscillatable stylus components may impose upon the reproduction quality thus avoiding distortion of the reproduced sound and reducing mechanical wear of sound tracks and stylus tip.

A further object of my invention is to provide a pickup of the magnetic type in which the relatively great weight of an oscillatingly mounted ferromagnetic member, desired for high-quality reproduction, is inherently compensated as regards any detrimental effects upon the quality of reproduction.

To achieve these objects, and in accordance with a feature of my invention, I provide a phonograph pickup with an elongated pickup arm which carries the stylus near one of its ends and has its other end portion resiliently mounted on a supporting structure so that the pivoted end is angularly movable relative to the mounting structure about a pivot center in two mutually perpendicular planes which are parallel to the respective planes of the sound-track undulations to be sensed by the stylus tip; and the pickup is further provided with two electric transducer means which are operatively coupled with the pivoted end portion of the stylus arm for response to arm movements in said respective two planes of motion, the points of coupling between the respective transducers and the pickup arm being located in proximity to the pivot center and remote from the stylus tip so that the transducer means are controlled by the stylus oscillations through a step-down leverage embodied in the stylus arm itself.

According to another feature of my invention, the above-mentioned pivoted end portion of the stylus arm is axially elongated and has a symmetrically four-cornered cross section; and a biasing body of resilient material such as rubber or synthetic rubber is disposed between that end portion and the surrounding supporting structure so that the stylus arm is normally biased to a given position and can be angularly deflected therefrom in opposition to the biasing action of the elastic material. By virtue of the four-cornered cross section of the end portion, such deflection will occur preferentially in two planes 90° displaced from each other.

According to still another feature of my invention the above-mentioned elongated end portion of the stylus arm consists of ferromagnetic material which forms a moving armature within the common gap space of two magnetic core or yoke structures of which each is provided with an induction coil. Each core structure may comprise a permanent magnet in which case the end portion of the arm consists of soft-magnetic iron. According to another, preferred feature of my invention, however, the pivoted arm portion consists of a permanent magnet whose respective poles are spaced along the longitudinal axis of the arm-magnet assembly, with the above-mentioned center point of pivotal deflection located in a neutral zone of the magnet between its two poles. In the latter case the core or yoke structure consist entirely of soft-magnetic material.

According to still another feature of my invention, relating to a stylus arm with an attached permanent magnet as described above, each of the two core structures has two pole ends which extend in parallel and mutually spaced relation along substantially the entire axial length of the magnet and are spaced from each other in a direction perpendicular to the pole spacing direction of the other core structure, thus forming a rectangular, or preferably square, gap space in which the permanent magnet is located and is held equally spaced from all four pole ends by means of the above-mentioned elastic material.

The term "pole spacing direction" as used herein represents the direction of an imaginary straight line which is perpendicular to a plane between a pair of opposed pole pieces and which plane is so located that movement of the magnet in or parallel to that plane will produce substantially no magnetic change or response in the electromagnet or yoke or core associated with those opposed pole pieces.

Further features of my invention, all set forth with particularity in the claims annexed hereto, relate to the design and tracking angle of the elongated stylus arm. According to one of these features, the stylus proper is rigidly mounted on the free end of the stylus arm with such an orientation and position relative to the arm that the stylus tip is located substantially on the longitudinal axis of the major portion of the arm's length including the pivoted end. According to another one of these features, the tracking angle of the stylus, that is the angle which the main longitudinal axis of the stylus arm including its pivoted end portion forms with the surface of the record disc is less than 90° and is equal to the corresponding cutting angle used when cutting the sound recording grooves into the disc.

The above-mentioned and other objects, advantages and features of my invention will be apparent from, and will be mentioned in, the following description in conjunction with the embodiments of pickups according to the invention illustrated by way of example on the accompanying drawings in which.

Figure 7:
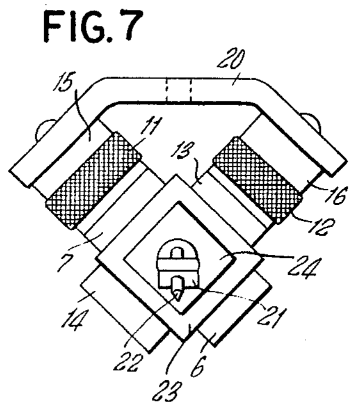
Figure 6:
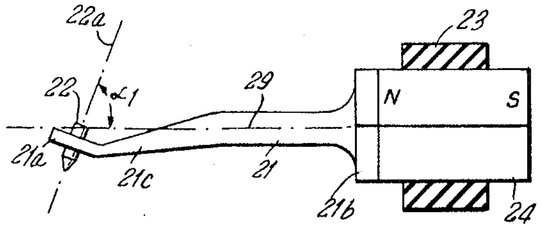
FIG. 6 is a partly sectional side view of a fourth embodiment.
Figure 6A:
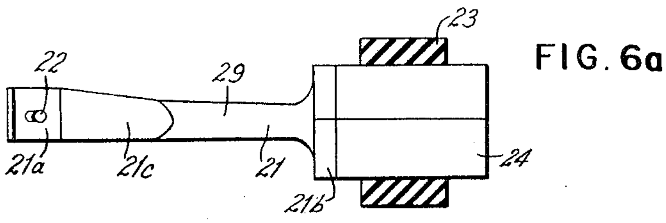

FIG. 6*a* is a corresponding top view;

FIG. 7 is a front view of the pickup shown in FIG. 6.

Figure 1:
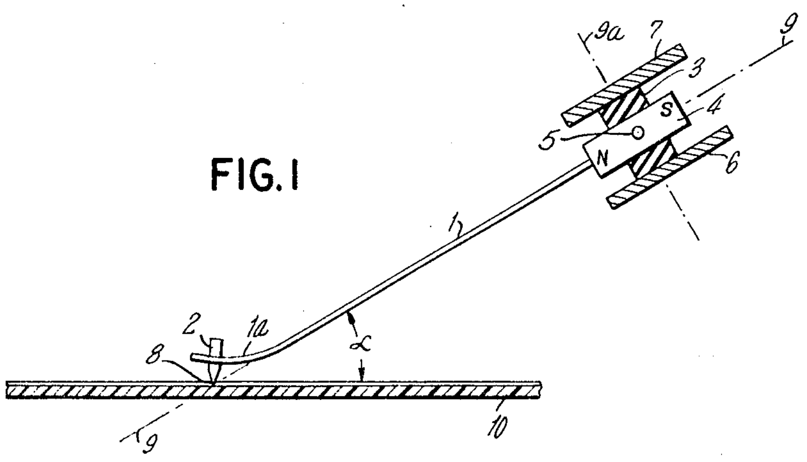
FIG. 1 is an explanatory and schematic illustration relating to a moving-magnet pickup according to the invention.
Figure 2:
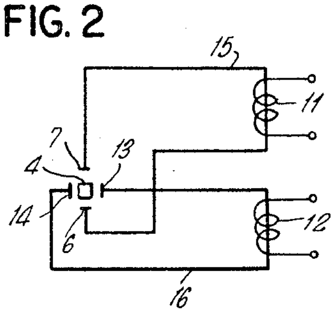
FIG. 2 is a schematic diagram of the magnetic circuits applicable in such a moving-magnet pickup.

The pickup schematically illustrated in FIGS. 1 and 2 has an elongated pickup arm 1 consisting of a leaf spring whose flat sides extend perpendicular to the plane of illustration in FIG. 1. The free end portion of arm 1 carries a stylus 2, such as a sapphire or diamond stylus. The rear end of arm 1 forms part of a pivot bearing and comprises an elongated prismatic body 4 of a square cross section which is seated in a bearing ring 3 of elastic material such as rubber. The body 4 consists of ferromagnetic material and is preferably a permanent magnet whose longitudinal axis 9 coincides with the main longitudinal axis of the leaf spring 1. The magnet 4 is polarized in the axial direction so that its north and south poles denoted in FIGS. 1 and 6 by N and S respectively, are located at axially opposite ends respectively. The magnet body 4 is stuck into the hole of ring 3 so that the magnetically neutral zone is located at the intersection of the two main geometric axes of the ring 7 of which one is coincident with the longitudinal axis 9 and the other, denoted by 9*a*, extends perpendicularly thereto. This point of intersection, denoted by 5, represents the pivot center of the arm 1.

The bearing ring 3 is firmly seated between parts 6 and 7 of a mounting structure. The parts 6 and 7 also form the pole ends of a magnetic circuit which in FIG. 2 is schematically shown at 15. The pole faces of pole ends 6 and 7 extend parallel to each other on opposite sides of body 4 along the entire axial length of the body. Located opposite the two other sides are respective poles 13 and 14 of another magnetic circuit 16. Each of the two magnetic circuits is provided with an induction coil schematically shown in FIG. 2 at 11 and 12 respectively.

The tip 8 of the stylus 2 engages the sound-track groove of a record carrier such as a phonograph disc 10 whose horizontal surface plane defines together with the longitudinal axis 9 of the arm 1 an angle $\alpha$ hereinafter called the "tracking angle." This angle is greater than 5° but less than 90° and is preferably equal to the corresponding angle of the cutting stylus used when producing the sound record, the axis of the stylus 2 being preferably also oriented relative to the record carrier 10 at an angle equal to the corresponding angle of the cutting stylus used for producing the record.

In the embodiment of FIG. 1 the free end portion 1*a* of the arm curves upwardly away from the main axis 9 of the stylus arm, and the stylus tip 8 is located substantially on the main axis 9.

By virtue of the described mounting of the magnet body 4 in bearing ring 3, the arm 1 including the magnet 4 can be deflected by response of the stylus to the sound tracks in the record groove, and such deflection will occur about the pivot center 5 in two directions forming an angle of 90° with respect to each other and extending parallel to the respective directions of the undulations formed by the two sound tracks of the groove.

When, as mentioned above, the tracking angle $\alpha$ and the orientation of the stylus 2 in the reproducing pickup are the same as the cutting angle and stylus orientation used when cutting the record, the occurrence of any distortion of the reproduced sound is most favorably minimized or avoided; but it should be understood that pickups according to the invention need not necessarily satisfy the just-mentioned condition.

The pivoted end portion 4 of the stylus arm may also consist of soft-magnetic material such as highly permeable iron. In the latter case, an electromagnet or permanent magnet must be included in each of the magnetic circuits 15 and 16.

It should be understood that the pivot center 5 need not be sharply defined. However, it is preferable, as shown in FIG. 1, to give the bearing ring 5 a relatively small axial extent as compared with the length of the stylus arm 1 and to also keep it shorter than the magnet 4.

The described angular deflections of the magnet 4 have the effect that its north pole will move closer toward one of the pole faces of the magnetic circuits while the south pole moves closer to the opposite pole face. In this manner, a magnetic push-pull action is produced in the appertaining magnetic circuit with the result of effectively generating a voltage in the induction coil of that circuit. Furthermore, the mass of the relatively heavy body 4 is approximately balanced about the pivot center, so that the weight of the body 4 is substantially compensated as regards its effect upon the engagement of the stylus with the record groove.

It will be apparent that the cross section of the magnet 4 or other pivoted end portion of the stylus arm need not necessarily have square shape. While a circular cross section may also be used, it is preferable to use a rectangular or other symmetrically four-cornered cross section in which the respective two main axes defined by each two opposite corner points are perpendicular to each other as is, for instance, the case with a cross section resembling a card-game diamond symbol.

The particular pickup shown in FIGS. 1 and 2, as well as those shown in FIGS. 3 to 5 and described below, are designed for reproduction of stereophonic recordings composed of a lateral sound track and a vertical sound track, the latter being formed by undulations in the bottom of the record groove. For example, the magnetic circuit 15 and the induction coil 11 in FIG. 2 may reproduce the vertical sound track, whereas the magnetic circuit 16 with coil 12 reproduces the lateral track.

Figures 3, 4, 5:
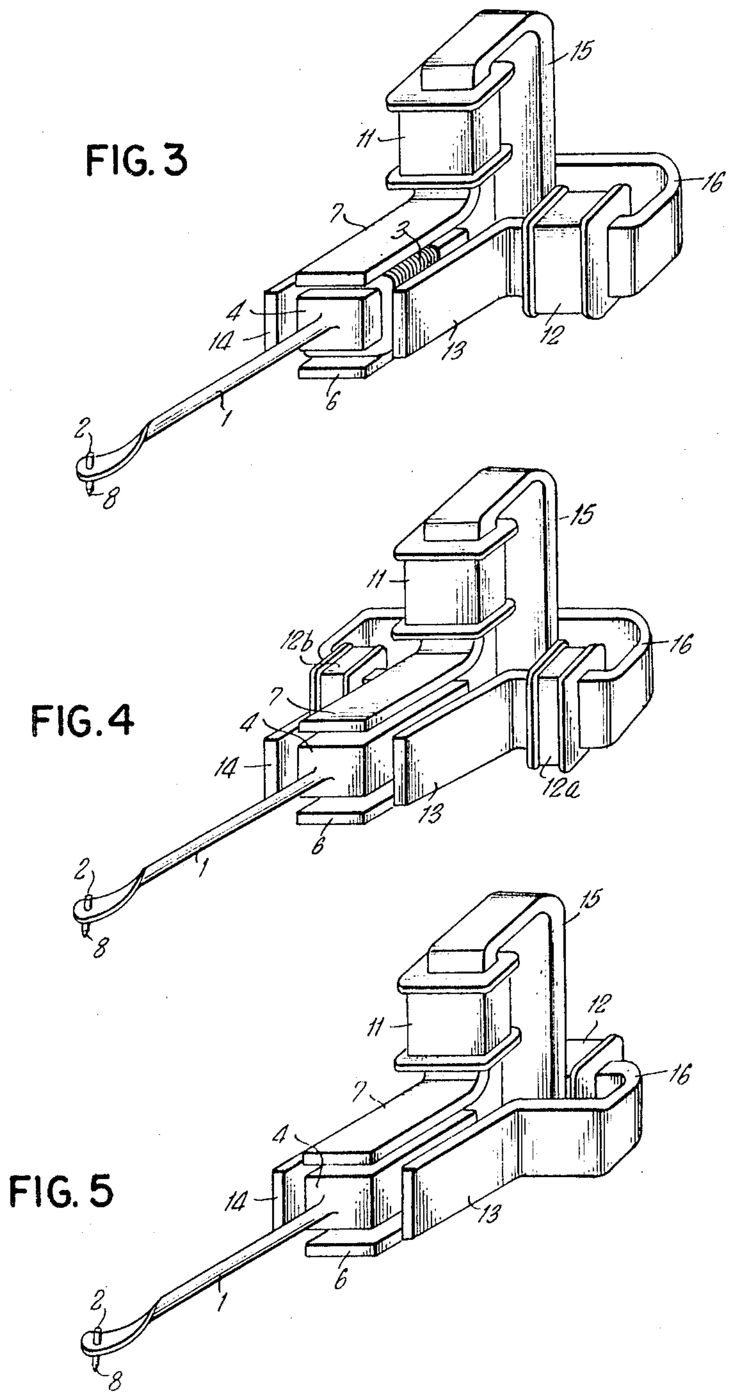
FIGS. 3, 4 and 5 illustrate in perspective three different embodiments of such pickups.

FIGS. 3, 4 and 5 illustrate respectively different designs of pickups corresponding in principle to the one described with reference to FIGS. 1 and 2. The permanent magnet 4 which forms the pivoted end portion of the stylus arm 1 has elongated prismatic shape and rectangular or square cross section. The magnetic circuits 15 and 16 are formed by respective cores or yokes shaped of iron strip material of rectangular cross section, and the pole ends 6, 7, 13 and 14 of the yokes form together an elongated gap space along the entire length of the magnet 4. The magnet 4 is mounted in the gap space by means of a ring 3 of rubber which is held in position by the pole ends of the yokes. The ring is shown only in FIG. 3, but is omitted in FIGS. 4 and 5.

The pole ends 6, 7, 13 and 14 are so disposed relative to each other that only an extremely small air gap remains between them on the one hand and the longitudinal faces of the permanent magent 4 on the other hand. The induction coil 12 for the lateral track is mounted on the yoke 16 in the vicinity of the magnet 4 in order to prevent stray fields from weakening the magnetic flux acting upon the coil. For this purpose, coil 12 in FIG. 3 is located immediately behind the point where the pole end 13 is bent rectangularly away from the wider bight portion of the generally U-shaped yoke structure 16, the geometric axis of coil 12 being parallel to the horizontal surface of the record carrier. The other induction coil 3, for response to the vertical sound track on the groove bottom, is likewise mounted as close as possible to the magnet 4. For this purpose, the coil 11 is disposed on yoke 15 immediately behind the location where the upper pole end 7 is bent rectangularly away from the wider bight portion of the yoke. The geometric axis of coil 11 is perpendicular to the plane of the record carrier and intersects the axis of induction coil 12.

It should be understood that, as usual, the pickup is enclosed in a pickup housing which is to be mounted on the tone arm of a phonograph. The above-described placing of the induction coils 11 and 12 as close as possible to the permanent magnet requires a relatively great width of the pickup housing because the induction coil 12 occupies relatively much space laterally of the magnet. The design illustrated in FIG. 4 has a more favorable arrangement of the coils. The above-described induction coil 12 is subdivided into two equal portions 12a and 12b of which one is located at the right and the other at the left of the permanent magnet.

However, the same purpose can be served by mounting the induction coil 12 behind the vertical bight portion of the U-shaped iron yoke 15 as is shown in FIG. 5. Consequently in the latter embodiment, the permanent magnet 4, the iron yoke 15 and the induction coil 12 are mounted one behind the other. This design is favorable as to space requirements, but does not permit placing the induction coil 12 as close to the permanent magnet 4 as in the embodiments of FIGS. 3 and 4. With respect to the design of the magnet 4, the position of the pole ends and the mounting of the induction coil 11, the three embodiments of FIGS. 3, 4 and 5 do not differ from each other.

By virtue of the two magnetic circuits, formed by yokes 15 and 16, for one and the same permanent magnet which forms an end portion of the stylus arm and is pivoted in the manner described, a high degree of separation of the acoustic reproduction of the two parralel sound tracks is secured.

It has been mentioned that, preferably, the tracking ange $\alpha$ (FIG. 1) and the orientation of the stylus 2 relative to the plane of the record carrier are the same as the respective angle and orientation applied when cutting the record. This preference is based upon the recognition that if the tracking angle during reproduction of the record is different from the cutting angle used when producing the record, the acoustic reproduction involves some distortion due to the fact that the motion of the reproducing pickup, when sensing a component sound track, differs from the corresponding component motion of the cutting stylus previously used for producing the record. This difference in component motions, inevitable with a pickup having a lever-type stylus arm, is greatly minimized or virtually eliminated if the recording as well as the reproducing is done with one and the same angle and the same orientation of the stylus relative to the record surface, this angle being smaller than 90°.

The described pickups further permit being used on conventional monaural record discs.

In pickups according to the invention, the pickup arm 1 may consist of steel but is preferably made of a material lighter in weight than the magnetic or magnetizable material of the pivoted end portion 4. Suitable for this purpose is synthetic material or light metal such as aluminum. Due to the light weight of such a stylus arm, the gravity center of the arm and magnet assembly can be placed very close to the pivot center, and the oscillating mass of the pickup relative to the pivot center can be kept within extremely slight limits.

In the embodiment illustrated in FIGS. 6, 6a and 7 the stylus arm 21 consists of aluminum and is firmly joined with an elongated permanent magnet 24 of square cross section magnetized in its longitudinal direction. The common longitudinal axis of magnet 24 and the major portion of arm 21 is denoted by 29. The arm 21 has a flange 21b, also of square cross section, to which the magnet 24 is cemented at one of its pole faces. The arm 21 extends away from the magnet 24 in coaxial relation thereto. At about one-half of the length of arm 21, it has a portion 21c which slightly curves downwardly away from the longitudinal axis 29. The portion 21c tapers in the vertical plane from its junction with the main portion of arm 21 toward the left, but its horizontal width simultaneously increases in the same direction. The portion 21c merges with a free end portion 21a which again extends angularly back toward the axis 29 and has constant width and constant thickness over its entire length.

Firmly attached by means of cement or varnish in a bore end portion 21a is the stylus 22 consisting, for example, of sapphire or diamond. The orientation of stylus 22 in end portion 21a is such that the angle $\alpha'$ formed above the longitudinal axis 29 by the stylus axis 22a and the longitudinal axis 29 and facing the magnet 24 is equal to, or smaller than 90°.

The magnet passes through a ring 23 of resilient material inserted between the poles 6, 7 of a magnet yoke 15 and the poles 13, 14 of another yoke 16. Each yoke is provided with an induction coil 11 or 12. The two yokes are rigidly mounted on a common holder 20 with the aid of which the entire pickup can be fastened to the tone arm of the phonograph. The two yokes correspond to those designated by the same reference numerals in FIG. 3, except that they are oriented in respective planes that are both inclined 45° to the horizontal record surface. The axis 22a of the stylus 22 extends in a vertical plane midway between the two planes of the magnetic poles. It will be recognized that this pickup is designed for reproducing stereophonic recordings in which the two sound tracks are located on opposite inclined sides of the record groove.

Due to the tapering shape of the arm 21, the end portion 21a has sufficient elasticity in the vertical direction to permit yielding of the stylus in the event of extreme forces that may occur when the pickup drops upon the record carrier.

In all embodiments described above, the oscillatable stylus assembly can be attached to the mounting structure or housing of the pickup simply by plugging the rear end portion or magnet 4, 24 into the opening of the elastic pivot ring 3, 23 where it remains firmly seated by friction. The elongated and straight shape of the assembly facilitates thus inserting or removing the stylus arm in its longitudinal direction.

It will be obvious to those skilled in the art, upon a study of this disclosure, that my invention permits of various modifications and may be embodied in pickups other than those particularly illustrated and described herein, without departing from the essence of my invention.

I claim:

1. A phonograph pickup transducer system comprising a pair of electromagnetic systems each comprised of a core terminating in a pair of spaced apart pole pieces forming a gap therebetween and a coil arranged about said core, the orientation of said pole pieces being such that they form a common gap and the pole spacing directions of the respective pairs of pole pieces are perpendicular to each other, an armature comprising a permanent magnet operatively supported in said common gap for angular vibration therein substantially about a point within said magnet, the magnetic axis of said armature being oriented substantially perpendicular to both said pole spacing directions, resilient means for supporting said armature and maintaining the proper orientation thereof, and means including a stylus connected with said armature for transmitting vibrations thereto.

2. A phonograph pickup transducer system comprising a pair of electromagnetic systems each comprised of a core terminating in a pair of spaced-apart pole pieces forming a gap therebetween and a coil arranged about said core, the orientation of said pole pieces being such that they form a common gap and the pole spacing directions of the respective pairs of pole pieces are perpendicular to each other, an armature comprising a permanent magnet operatively supported in said common gap for angular vibration therein substantially about a point intermediate the poles of said magnet, the magnetic axis of said armature being oriented substantially perpendicular to both said pole spacing directions, resilient means for supporting said armature and maintaining the proper orientation thereof, and means including a stylus connected with said armature for transmitting vibrations thereto.

3. A transducer system according to claim 2 wherein said armature has a square cross section.

4. A transducer system according to claim 2 wherein said armature has a circular cross section.

5. A transducer system according to claim 2 in which the poles of both electromagnetic systems extend to points near both poles of the permanent magnet armature and the armature is supported for universal pivotal movement substantially about a mid zone thereof to cause its poles to act oppositely as to the poles of either electromagnetic system, one approaching any electromagnetic pole while the other recedes from that electromagnetic pole and approaches the opposite electromagnetic pole.

6. A phonograph pickup cartridge comprising a cartridge body and a transducer system operatively mounted therein, said transducer system comprising a pair of electromagnetic systems each comprised of a core terminating in a pair of spaced-apart pole pieces forming a gap therebetween and a coil arranged about said core, the orientation of said pole pieces being such that they form a common gap and the pole spacing directions of the respective pairs of pole pieces are perpendicular to each other, an armature comprising a permanent magnet operatively supported in said common gap for angular vibration therein substantially about a point intermediate the poles of said magnet, the magnetic axis of said armature being oriented substantially perpendicular to both said pole spacing directions, resilient means for supporting said armature and maintaining the proper orientation thereof, and means including a stylus connected with said armature for transmitting vibrations thereto.

7. A pickup cartridge according to claim 6 wherein said pole pieces are so oriented that both said pole spacing directions form an angle of 45° with a vertical plane drawn through the longitudinal axis of said pickup cartridge.

8. A pickup cartridge according to claim 6 wherein said pole pieces are so oriented that one pole spacing direction is parallel to and one pole spacing direction is perpendicular to a vertical plane drawn through the longitudinal axis of said pickup cartridge.

9. A phonograph pickup cartridge according to claim 6 wherein said armature has a square cross section.

10. A phonograph pickup cartridge according to claim 6 wherein said armature has a circular cross section.

11. A phonograph pickup transducer system comprising a pair of electromagnetic systems and a core, each of said electromagnetic systems terminating in a pair of spaced-apart pole pieces forming a gap therebetween and a coil arranged about each of said systems, the orientation of said pole pieces being such that they form a common gap and the pole spacing directions of the respective pairs of pole pieces are perpendicular to each other, an armature comprising a permanent magnet operatively supported in said common gap for angular vibration therein substantially about a point intermediate the poles of said magnet, the magnetic axis of said armature being oriented substantially perpendicular to both said pole spacing directions, resilient means for supporting said armature and maintaining the proper orientation thereof, and means including a stylus connected with said armature for transmitting vibrations thereto.

12. A phonograph pickup cartridge comprising a cartridge body and a transducer system operatively mounted therein, said transducer system comprising a pair of electromagnetic systems and a core, each of said electromagnetic systems terminating in a pair of spaced-apart pole pieces forming a gap therebetween and having a coil arranged about each of said systems, the orientation of said pole pieces being such that they form a common gap and the pole spacing directions of the respective pairs of pole pieces are perpendicular to each other, an armature comprising a permanent magnet operatively supported in said common gap for angular vibration therein substantially about a point intermediate the poles of said magnet, the magnetic axis of said armature being oriented substantially perpendicular to both said pole spacing directions, resilient means for supporting said armature and maintaining proper orientation thereof, and means including a stylus connected with said armature for transmitting vibrations thereto.

13. A pickup for stereophonic grooved sound records with two component sound tracks in the groove, comprising a mounting structure forming an opening having a cross section with two pairs of parallel edges, an elongated pickup arm, a permanent magnet rigidly attached to said arm at one end thereof and being located in said opening with the arm protruding away from said opening, biasing means of resilient material disposed in said opening between said magnet and said structure and of short axial length compared with said arm whereby said arm is angularly deflectable relative to said structure about a pivot point near the center of said resilient means and in two planes corresponding to the respective directions of the edges of said cross section, said magnet being polarized axially with respect to said arm and having a magnetically neutral zone located at said biasing means, a stylus rigidly mounted on the protruding end of said arm, said structure comprising means forming two magnetic circuits inductively coupled with said permanent magnet for effecting binaural reproduction, said magnetic circuits having respective transducer coils for producing voltages in response to arm movements in said respective planes.

14. A pickup for stereophonic grooved sound records having two stereophonically interrelated sound tracks in the groove, comprising two cores of magnetizable material rigidly joined with each other, each core having two poles opposite each other and spaced from each other in a direction perpendicular to the spacing between the two poles of the other core, said four poles defining together a gap space of rectangular cross section, induction coils mounted on said respective cores to produce respective pickup output voltages, a stylus arm of elongated shape having a permanent magnet rigidly mounted at one of the two arm ends, said magnet having a smaller rectangular cross section than said gap space and being located in said space with respective edges of said two cross sections substantially parallel to each other, biasing means of resilient material normally holding said magnet at substantially equal distances from said four respective poles whereby said arm is resiliently deflectable relative to said cores in two planes extending at a right angle to each other in said respective directions of pole spacing, said stylus arm proturding axially away from said gap space and having a stylus tip at its protruding end, said stylus tip extending downwardly beyond the symmetry axis of said stylus arm.

15. In a pickup according to claim 14, said biasing means of elastic material being disposed in said gap space between said poles and said magnets and securing said magnet to said cores.

16. A pickup for stereophonic grooved sound records having two stereophonically interrelated sound tracks in the groove, comprising two iron cores of flat strip material rigidly connected with each other, each core having two elongated straight pole portions parallel to each other and extending at a right angle to the pole portions of the other core whereby said four pole portions jointly define an elongated gap space of substantially square cross section, induction coils mounted on said respective cores to produce respective pickup output voltages, an elongated stylus arm having a permanent magnet rigidly mounted on one end of the arm and located in said gap space, said magnet having a substantially square rectangular cross section smaller than said space and being elongated in the axial direction of said arm respective edges of said two cross sections being substantially parallel to each other, said straight pole portions extending over the entire length of said magnet, resilient means disposed in said space between said magnet and said pole portions and normally holding said magnet in coaxial relation to said space and at equal distances from said respective pole portions, said stylus arm having the major portion of its length protrude from said gap space and having a stylus tip at its protruding end.

17. In a pickup according to claim 16, each of said cores having generally U-shape and having a bight portion in which the U-limbs are spaced from each other a greater distance than at said pole portions, said coils being mounted on said bight portions of said respective cores.

18. In a pickup according to claim 16, said coils having respective axes extending at right angles respectively to the longitudinal axis of said magnet and being mounted at respective locations beyond the inner longitudinal end of said magnet.

19. A pickup for stereophonic grooved sound records with two component sound tracks in the groove, comprising a mounting structure forming an opening, an elongated stylus arm of non-magnetic material, a permanent magnet rigidly attached to said arm at one end thereof and having a magnetic axis substantially coaxial with the axis of said arm, said magnet being located in said opening with the arm protruding axially away from said opening, resilient means disposed in said opening between said magnet and said structure whereby said arm is resiliently deflectable in angular relation to said structure within two mutually perpendicular planes, a stylus rigidly mounted on the protruding end portion of said arm and having a tip extending angularly away from the axis of said arm for engaging a record groove to impart movements to said arm in said two planes, said structure comprising two magnetic circuits inductively coupled with said permanent magnet for effecting binaural reproduction, said magnetic circuits having respective transducer coils for producing voltages in response to arm movements in said respective planes.

20. In a stylus according to claim 19, said pickup arm consisting of material lighter in weight than said permanent magnet and having said major portion of its length extend in coaxial relation to said magnet.

21. In a stylus according to claim 19, said pickup arm consisting of material lighter in weight than said permanent magnet and having a major portion of its length extend in coaxial relation to said magnet, said stylus tip extending in a direction which forms together with the axis of said magnet an angle of at most 90° seen from said magnet and located at the side of said arm that faces away from the stylus tip.

22. In a stylus according to claim 19, said pickup arm consisting of light metal and having a first portion extending away from said magnet in coaxial relation thereto, said arm having a second portion curving away from the magnet axis and having tapering thickness and greater width than said first portion, and said protruding end portion of said arm extending from said second portion angularly back toward said axis, said protruding end portion being flat and having constant thickness and constant width, and said stylus being mounted on said end portion and having a stylus axis at a right angle to the flat areas of said end portion.

23. A pickup for stereophonic grooved sound records with two component sound tracks in the groove, comprising a mounting structure forming an axially elongated opening, an elongated stylus arm having a substantially coaxial end portion resiliently mounted in said opening in coaxial relation thereto, elastic means disposed in said opening around said end portion and between said end portion and said structure, said elastic means forming the only attachment of said arm to said structure, said arm being angularly movable relative to said structure in two mutually perpendicular planes substantially about a point on the axis of said end portion in said opening, a stylus firmly mounted on the other end portion of said arm and extending at an angle to the longitudinal axis of said arm for engaging a stereophonic record groove to impart movements to said arm in said two planes in response to the respective sound tracks of the groove, and two electric transducer means operatively coupled with said arm at said end portion for effecting binaural reproduction, said tranducers having respective different orientations for response to arm movements in said respective planes.

24. A pickup for stereophonic grooved sound records with two component sound tracks in the groove, comprising a mounting structure forming an opening, an elongated stylus arm having a rear end portion whose cross section transverse to the axis of said arm has symmetrical four-cornered shape, said rear end portion being located in said opening and said arm having the major portion of its length protruding axially from said rear end portion and said opening, mounting means of resilient material disposed in said opening between said rear end portion and said structure, said resilient means being axially short in comparison with said arm and forming a universal pivot point about which said arm is resiliently deflectable in angular relation to said structure within two mutually perpendicular planes corresponding to the respective two symmetry axes of said cross section, a stylus rigidly mounted on the protruding end portion of said arm and extending at an angle to the axis of said arm for engaging a record groove to impart movements to said arm in said two planes in response to the respective sound tracks of the groove, and two electric transducer means firmly joined with said structure and operatively coupled with said arm at said pivoted end portion for effecting binaural reproduction, said two transducers having respective different orientations for response to movements of said arm in said respective planes.

25. A pickup for stereophonic grooved sound records with two component sound tracks in the groove, comprising a mounting structure, an elongated stylus arm having a rear end portion resiliently mounted on said structure and being angularly movable about a point of said rear end portion relative to said structure in two mutually perpendicular planes, said arm being substantially rigid along the major portion of its length including said rear end portion and being inherently flexible at the other end in a direction midway between said two planes, a stylus firmly mounted on the other end of said arm for engaging a stereophonic record groove to impart movements to said arm in said two planes in response to the respective sound tracks of the groove, said stylus having its tip located substantially on the longitudinal axis of said major length portion of said arm, and two electric transducer means firmly joined with said structure and operatively coupled with said arm at said rear end portion for effecting binaural reproduction, said two transducers having respective different orientations for response to movements of said arm in said respective planes.

26. A pickup for stereophonic grooved sound records with two component sound tracks in the groove, comprising a mounting structure forming an axially elongated opening, an elongated stylus arm having a rear end portion located in said opening and having the major portion of its length protruding axially away from said opening, said rear end portion and said opening having a substantially symmetrical four-cornered cross section transverse to the longitudinal axis of said arm, resilient means disposed in said opening between said rear end portion and said structure whereby said arm is resiliently deflectable in angular relation to said structure within two mutually perpendicular planes corresponding to the respective directions of the edges of said crosst section, a stylus rigidly mounted on the protruding end portion of said arm for engaging a record groove to impart movements to said arm in said two planes in response to the respective sound tracks of the groove, and two electric transducer means operatively coupled with said arm at said pivoted end portion for effecting binaural reproduction, said two transducers having respectively different orientations for response to arm movements in said respective planes.

27. A pickup for stereophonic grooved sound records with two component sound tracks in the groove, comprising a mounting structure having two magnetic circuits of which each has a pole gap rectangularly related to the other gap and forming jointly a gap opening of generally square cross section, an elongated stylus arm having a substantially coaxial rear end portion of ferromagnetic material having a generally square cross section smaller than and parallel to said cross section of said opening, said rear end portion being resiliently mounted in said opening and being angularly movable about a point of said rear end portion relative to said structure in two mutually perpendicular planes parallel to adjacent edges respectively of said opening, a stylus firmly mounted on the forward end portion of said arm and extending at an angle to the longitudinal axis of said arm for engaging a stereophonic record groove to impart movements to said arm in said two planes in response to the respective sound tracks of the groove, and two electric transducer coils mounted on said respective magnetic circuits and thereby inductively coupled with said ferromagnetic end portion and oriented for producing voltages in response to arm movements in said respective planes so as to effect binaural reproduction.

28. A phonograph pickup for grooved records, comprising a mounting structure for attachment to a phonograph tone arm, said structure forming an axially elongated opening and having a resilient bearing sleeve coaxially seated in said opening, an elongated rod-shaped stylus arm having a coaxial end portion engaging said opening and having a symmetrical four-cornered cross section transverse to the axis of said arm, a stylus mounted on the other end of said arm and extending at an angle to the axis of said arm, said stylus being deflectable due to said sleeve and together with said arm relative to said structure in all directions of a plane perpendicular to the axis of said opening, said arm being rigid and extending straight along its longitudinal axis over the major extent of the length of said arm including said rear end portion, and two transducer means coupled with said arm at a location closer to said sleeve than to said stylus to be actuated by step-down leverage for effecting binaural reproductions.

29. A pickup for stereophonic grooved sound records having two stereophonically interrelated sound tracks in the groove, comprising two cores of magnetizable material, each core having two poles opposite each other and spaced from each other in a direction perpendicular to the spacing between the two poles of the other core, said four poles defining together a gap space of substantially square cross section, induction coils mounted on said respective cores to produce respective pickup output voltages, a stylus arm of elongated shape having a permanent magnet rigidly mounted at one of the two arm ends, said magnet having a smaller rectangular cross section than said gap space and being located in said space with respective edges of said two cross sections substantially parallel to each other, a ring-structure of resilient material disposed in said gap space around said magnet and between said magnet and said four poles and securing said magnet to said cores, said resilient material holding said magnet at substantially equal distances from said four respective poles whereby said arm is resiliently deflectable relative to said cores in two planes extending at a right angle to each other in said respective directions of pole spacing, said stylus arm protruding axially away from said gap space and having a stylus tip at its protruding end, said stylus tip extending angularly away from said arm in a plane including a diagonal of said square cross section of said magnet.

30. A pickup for stereophonic grooved sound records having two stereophonically interrelated sound tracks in the groove, comprising two core structures of magnetizable material, each core structure having two poles opposite each other and spaced from each other in a direction perpendicular to the spacing between the two poles of the other core structure, said four poles defining together a pole space of substantially square shape, induction coils mounted on said respective core structures to produce respective pickup output voltages, a stylus arm of elongated shape resiliently deflectable relative to said core structures in two planes extending at a right angle to each other in said respective directions of pole spacing, a permanent magnet rigidly mounted on one end of said stylus arm, said magnet having a cross section smaller than said square shape of said pole space and being universally movable in said space about a geometric pivot point on the longitudinal axis of said arm and substantially in the center of said pole space, said magnet being polarized in the axial direction of said arm and pole space and having a neutral zone in which said pivot point is located, a ring member of resilient material disposed around said magnet and having the tendency to hold said magnet at substantially equal distances from said four respective poles, said stylus arm protruding axially away from said pole space and magnet and having at its protruding end a stylus tip extending angularly away from said arm in a plane substantially diagonal to said square shape of said pole space.

References Cited

UNITED STATES PATENTS

| | | | |
|---|---|---|---|
| 2,093,540 | 9/1937 | Blumlein | 179—41 |
| 2,864,897 | 12/1958 | Kaar | 179—100.41 |
| 2,875,282 | 2/1959 | Reiback | 179—100.41 |
| 1,804,961 | 5/1931 | Thomas | 179—100.41 |
| 1,855,150 | 4/1932 | Jones | 179—100.41 |
| 2,670,407 | 2/1954 | Martin | 179—100.41 |
| 2,507,708 | 5/1950 | Greener | 179—100.41 |

FOREIGN PATENTS

| | | |
|---|---|---|
| 334,551 | 9/1930 | Great Britain. |
| 336,648 | 10/1930 | Great Britain. |

OTHER REFERENCES

Erlich, Joel: All About Stereo Discs. Audiocraft Magazine, February 1958. Pages 16–19 and 43–45.

Carlson, Ruben E.: Manufacture of a High Quality Cartridge. Audio, August 1958. Pages 30–32, 94 and 95.

Tremaine, H. M.: The Audio Encyclopedia, New York, The Bobbs-Merrill Company, Inc., 1959. Section 16, p. 477, Pickups. Tk 5981 T72.

BERNARD KONICK, Primary Examiner

RAYMOND F. CARDILLO, Jr., Assistant Examiner